United States Patent
Ono et al.

(10) Patent No.: US 10,128,071 B2
(45) Date of Patent: *Nov. 13, 2018

(54) ABRASION RESISTANT MATERIAL, PUFFER CYLINDER, AND PUFFER TYPE GAS CIRCUIT BREAKER

(71) Applicant: HITACHI, LTD., Tokyo (JP)

(72) Inventors: Masahiko Ono, Tokyo (JP); Makoto Hirose, Tokyo (JP); Daisuke Ebisawa, Tokyo (JP); Hisashi Urasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/531,754

(22) PCT Filed: Sep. 16, 2015

(86) PCT No.: PCT/JP2015/076359
§ 371 (c)(1),
(2) Date: May 31, 2017

(87) PCT Pub. No.: WO2016/088430
PCT Pub. Date: Jun. 9, 2016

(65) Prior Publication Data
US 2017/0271113 A1    Sep. 21, 2017

(30) Foreign Application Priority Data
Dec. 3, 2014  (JP) .................... 2014-244711

(51) Int. Cl.
*H01H 33/88*  (2006.01)
*B32B 7/02*   (2006.01)
*B32B 15/20*  (2006.01)

(52) U.S. Cl.
CPC ............. *H01H 33/88* (2013.01); *B32B 7/02* (2013.01); *B32B 15/20* (2013.01); *B32B 2307/50* (2013.01); *H01H 2205/002* (2013.01)

(58) Field of Classification Search
CPC ...... H01H 33/16; H01H 33/22; H01H 33/596; H01H 1/50; H01H 1/5822;
(Continued)

(56) References Cited

U.S. PATENT DOCUMENTS 3,671,314 A * 6/1972 Gackstetter ............ H01H 1/02
427/123
4,628,164 A * 12/1986 Talpo .................... H01H 33/12
200/258

(Continued)

FOREIGN PATENT DOCUMENTS

JP     62-140326 A    6/1987
JP     63-184223 A    7/1988
(Continued)

OTHER PUBLICATIONS

International Search Report, PCT/JP2015/076359, dated Dec. 15, 2015, 2 pgs.

*Primary Examiner* — Truc Nguyen
(74) *Attorney, Agent, or Firm* — Volpe and Koenig, P.C.

(57) ABSTRACT

Disclosed is an abrasion resistant material having low cost and excellent abrasion resistance, a puffer cylinder, and a puffer type gas circuit breaker. The abrasion resistant material includes: a base material which is formed of pure aluminum or aluminum alloy and has an unevenness structure formed on its surface; and an aluminum hydrated oxide film which is formed on the surface of the base material, wherein a surface of the aluminum hydrated oxide film is provided with an unevenness structure which is finer than the unevenness structure of the base material.

20 Claims, 5 Drawing Sheets (58) Field of Classification Search
CPC ... H01H 2001/5827; H01H 2033/6648; H01H 33/161; H01H 33/32; H01H 33/34; H01H 33/38; H01H 33/6606; H01H 33/664; H01H 33/91

See application file for complete search history.

(56) References Cited

U.S. PATENT DOCUMENTS

| | | |
|---|---|---|
| 2006/0260678 A1 | 11/2006 | Nagao et al. |
| 2007/0221626 A1 | 9/2007 | Uchii |
| 2015/0357137 A1* | 12/2015 | Kubo .................... H01H 33/06 218/90 |

FOREIGN PATENT DOCUMENTS

| | | |
|---|---|---|
| JP | 2000-067717 A | 3/2000 |
| JP | 2003-297199 A | 10/2003 |
| JP | 2006-325363 A | 11/2006 |
| JP | 2007-258137 A | 10/2007 |
| JP | 2008-277014 A | 11/2008 |
| JP | 2013-039004 A | 2/2013 |

* cited by examiner

ABRASION RESISTANT MATERIAL, PUFFER CYLINDER, AND PUFFER TYPE GAS CIRCUIT BREAKER

TECHNICAL FIELD

The present invention relates to an abrasion resistant material, a puffer cylinder, and a puffer type gas circuit breaker.

BACKGROUND ART

A puffer type gas circuit breaker for electric power includes a container filled with an arc extinguishing gas and the container includes therein a fixed contact, a movable contact connected thereto and separated therefrom, a puffer cylinder connected to the movable contact, a piston moving relative to an inner wall surface of the puffer cylinder, a puffer room having a suction hole for sucking an arc extinguishing gas and an ejection hole for ejecting the gas toward the contact, and a wear ring provided on an outer circumferential portion of the piston and sliding on the inner wall surface of the puffer cylinder, and the arc extinguishing gas ejected from the ejection hole blows to an arc generated in an opening between the fixed contact and the movable contact so that the arc disappears.

In many cases, the puffer cylinder of the puffer type gas circuit breaker with such a configuration uses aluminum (pure aluminum or aluminum alloy) for a decrease in weight. However, since aluminum is a material that is easily abraded, various surface treatments may be applied thereto to prevent the abrasion of sliding portions.

In general, an alumite treatment, a plating treatment, or various coatings are adopted in order to improve the abrasion resistance of aluminum.

As a technology for improving the abrasion resistance of aluminum, for example, there is known a technology disclosed in PTL 1. PTL 1 discloses a technology in which a puffer cylinder, an operation rod, and a pressing plate are formed of pure aluminum or an aluminum alloy and an aluminum oxide film is formed by an alumite treatment at a portion where these components are in contact with each other.

Further, PTL 2 discloses a technology in which a seal rod is slidably supported by a penetration hole of a gas container and a coating layer of amorphous carbon or diamond-like carbon which is an abrasion resistant and low friction material is formed on a sliding surface sliding on the seal rod in a seal member formed of synthetic rubber or fluororesin to prevent an arc extinguishing gas inside the gas container from leaking to an operation mechanism.

Furthermore, PTL 3 discloses a technology in which a lubricating silicone grease is applied to an outer circumferential surface of a cylinder sliding when a fixed arc contact and a movable arc contact are opened and separated in order to reduce friction.

CITATION LIST

Patent Literature

PTL 1: JP 63-184223 A
PTL 2: JP 2008-277014 A
PTL 3: JP 2007-258137 A

SUMMARY OF INVENTION

Technical Problem

However, in the technology disclosed in PTL 1, an alumite treatment is performed on a portion where the puffer cylinder, the operation rod, and the pressing plate are in contact with one another. Here, an alumite film formed by the alumite treatment is excellent in corrosion resistance and abrasion resistance, but since anodizing is required for the alumite treatment, electric power for a facility increases. Further, when sulfuric acid is used, a waste water treatment facility is necessary. As a result, there is room for improvement in terms of cost.

In addition, in the technology disclosed in PTL 2, the abrasion resistance of the sliding member is improved by the coating with a low friction material such as amorphous carbon or diamond-like carbon, but since a high frequency plasma CVD (Chemical Vapor Deposition) method needs to be performed for the coating, it is necessary to prepare a vacuum device having a size for processing the puffer cylinder in the case of the application to the puffer cylinder. As a result, there is room for improvement in facility cost.

Furthermore, in the technology disclosed in PTL 3, since a lubricating silicone grease is used on the outer circumferential surface of the cylinder which is a sliding portion, deterioration of the silicone grease needs to be considered in the case of the long-time use and thus a maintenance needs to be performed periodically. Even in the case of the application to the puffer cylinder which does not use lubricant, a technology for improving the abrasion resistance is needed.

The invention has been made in view of the above-described circumstances and an object of the invention is to provide an abrasion resistant material having low cost and excellent abrasion resistance, a puffer cylinder, and a puffer type gas circuit breaker.

Solution to Problem

In order to achieve the object, the present invention provides an abrasion resistant material including: a base material which is formed of pure aluminum or aluminum alloy and has an unevenness structure formed on its surface; and an aluminum hydrated oxide film which is formed on the surface of the base material, wherein a surface of the aluminum hydrated oxide film is provided with an unevenness structure which is finer than the unevenness structure of the base material.

Furthermore, in order to achieve the object, the present invention provides a puffer cylinder which is formed as a hollow cylindrical member by pure aluminum or aluminum alloy, wherein a piston is fitted into the member and the piston moves in a reciprocating manner while sliding on an inner wall surface of the member, wherein a surface of the inner wall surface is provided with an unevenness structure in at least a part sliding on the piston, wherein a surface of the unevenness structure is provided with an aluminum hydrated oxide film, and wherein a surface of the aluminum hydrated oxide film is provided with an unevenness structure which is finer than the unevenness structure of the inner wall surface.

Furthermore, in order to achieve the object, the present invention provides a puffer type gas circuit breaker including: a container which is filled with an arc extinguishing gas; a fixed contact; a movable contact; a puffer cylinder; and a piston which are provided inside the container, wherein the movable contact is connected to the fixed contact to be movable close thereto and away therefrom, wherein the puffer cylinder is connected to the movable contact, wherein the piston is provided inside the puffer cylinder and is adapted to move while sliding on an inner wall surface of the puffer cylinder and to suck and eject an arc extinguishing gas so that an arc generated in an opening between the fixed contact and the movable contact disappears by the gas blowing to the arc, and wherein the puffer cylinder is the puffer cylinder according to the present invention.

Advantageous Effects of Invention

According to the invention, it is possible to provide an abrasion resistant material having low cost and excellent abrasion resistance and a puffer cylinder and a puffer type gas circuit breaker using the same. Further, since the base material of aluminum or aluminum alloy has excellent abrasion resistance and thus can reduce abrasion powder, it is possible to provide an abrasion resistant material having excellent sliding characteristics and a puffer cylinder and a puffer type gas circuit breaker using the same.

DESCRIPTION OF EMBODIMENTS

Hereinafter, an abrasion resistant material, a puffer cylinder, and a puffer type gas circuit breaker of the invention will be described with reference to examples and drawings. However, the invention is not limited to these examples.

Example 1

Figure 1:
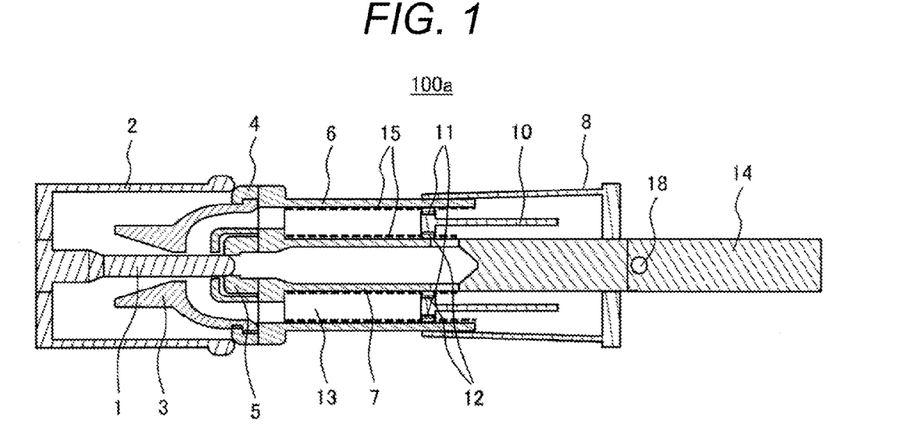
FIG. 1 is a cross-sectional view (a current supply state) schematically illustrating an example of a puffer type gas circuit breaker according to the invention.

FIG. 1 is a cross-sectional view (a current supply state) schematically illustrating an example of a puffer type gas circuit breaker according to the invention.

As illustrated in the drawing, a puffer type gas circuit breaker 100a of this example has a configuration in which a fixed electrical connection portion includes a fixed contact 1 and a fixed main contact 2 disposed outside the fixed contact 1 and a movable electrical connection portion contacting the fixed electrical connection portion includes a movable contact 5 and a movable main contact 4 disposed outside the movable contact 5 and is fixed to a puffer cylinder 6 formed as a hollow cylindrical member.

A cylinder shaft 7 is provided at a center portion of the puffer cylinder 6 and the cylinder shaft 7 is connected to an insulated operation rod 14 through a link 18. When the insulated operation rod 14 is driven by an operation device (not illustrated), a pole closing or opening operation for the fixed electrical connection portion and the movable electrical connection portion is performed. Further, an external collector 8 is disposed on an outer circumferential portion of the puffer cylinder 6 and the external collector 8 is connected to a movable main circuit conductor (not illustrated) supported by an insulated cylinder (not illustrated).

On the other hand, a piston 10 is fitted into the puffer cylinder 6 and a puffer room 13 for compressing an arc extinguishing gas is formed while being surrounded by an inner wall surface of the puffer cylinder 6, an outer surface of the cylinder shaft 7, and the piston 10. The puffer cylinder 6 is generally formed of pure aluminum or aluminum alloy, and the piston 10 is formed of metal such as aluminum alloy or iron. In this example, both the puffer cylinder 6 and the piston 10 were formed of aluminum alloy. Wear rings 11 and 12 having different diameters are respectively provided on the outer circumferential portion of the front end of the piston 10 and the piston 10 and the inner wall surface of the puffer cylinder 6 and the piston 10 and the outer surface of the cylinder shaft 7 slide on each other through the wear rings 11 and 12 in accordance with the movement of the piston 10.

Figure 2:
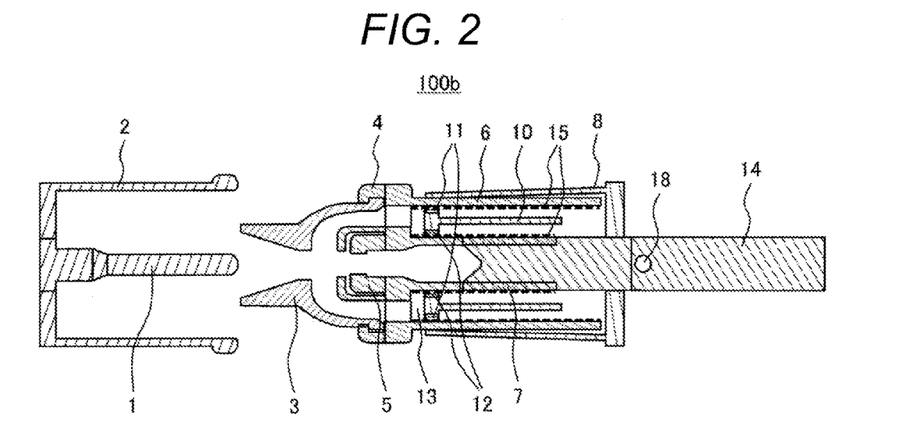
FIG. 2 is a cross-sectional view (a current interruption state) schematically illustrating an example of the puffer type gas circuit breaker according to the invention.

FIG. 2 is a cross-sectional view (a current interruption state) schematically illustrating an example of the puffer type gas circuit breaker according to the invention. That is, FIG. 2 illustrates a state where a current interruption operation is performed from the current supply state of FIG. 1. In this current interruption operation, the puffer cylinder 6 moves rightward of FIG. 2. In accordance with this movement, the fixed contact 1 and the movable contact 5 are separated from each other and the piston 10 moves to compress the puffer room 13 so that the volume thereof decreases. Since an arc extinguishing gas blows from an insulation nozzle 3 to an arc generated between the fixed contact 1 and the movable contact 5, the arc disappears.

Figure 3:
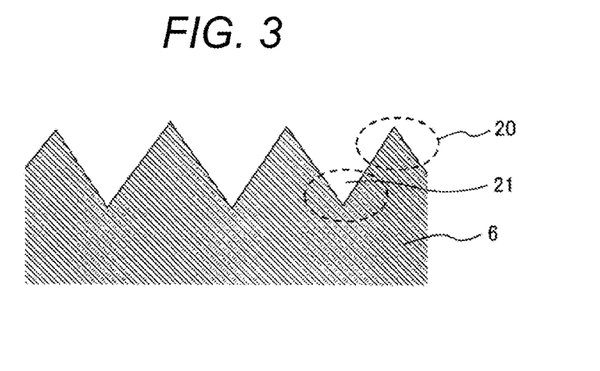
FIG. 3 is a cross-sectional view schematically illustrating an unevenness structure of an inner wall surface of a puffer cylinder 6 (after machining) according to the invention.

In the puffer type gas circuit breaker 100a of this example with such a configuration, an unevenness structure was formed on the inner wall surface of the puffer cylinder 6 by machining in a range (a chain line portion indicated by Reference Numeral 15) wider than the sliding portions of the wear rings 11 and 12. FIG. 3 is a cross-sectional view schematically illustrating an unevenness structure of the inner wall surface (after machining) of the puffer cylinder 6 according to the invention. A convex portion 20 of the unevenness structure protrudes in a direction orthogonal to the movement direction of the puffer cylinder. In FIG. 3, the arithmetic average roughness Ra (corresponding to JIS (Japanese Industrial Standards) B 0601: 2003 (ISO (International Organization for Standardization) 4287: 1997) of the inner wall surface of the puffer cylinder 6 was 0.7 μm and an unevenness structure having a substantially triangular cross-section was formed.

In this way, when the unevenness structure is provided on the inner wall surface of the puffer cylinder 6, an actual contact area of the wear rings 11 and 12 which are mating materials can be decreased. In addition, the convex portion 20 suppresses the abrasion of the puffer cylinder 6 by scraping the wear rings 11 and 12 which are mating members, and suppresses the generation of abrasion powder generated from the puffer cylinder 6. As a result, excellent sliding characteristics can be obtained. In order to obtain such an effect, the Ra of the surface of the puffer cylinder 6 after machining is desirably 0.5 to 2 μm (0.5 μm or more and 2 μm or less). When the Ra is smaller than 0.5 μm, the abrasion of the mating material decreases. Meanwhile, when the Ra is larger than 2 μm, the abrasion of the mating material increases too much. In order to satisfy the initial conformability (initial sliding property) and the abrasion resistance (in which the wear ring is not excessively scraped) of the wear ring, Ra is desirably 0.5 to 2 μm and more desirably 0.5 to 1.5 μm. In this example, Ra was set to 0.7 μm.

Further, the puffer cylinder 6 with the unevenness structure was set as a base material and an aluminum hydrated oxide film was formed on the inner wall surface of the puffer cylinder 6. As a treatment method of forming the hydrated oxide film, a chemical conversion treatment of immersing the puffer cylinder 6 having a cleaned machined surface (after acid cleaning, degreasing cleaning, and the like) into pure water heated to 95° C. or more for a predetermined time was performed.

Figure 4:
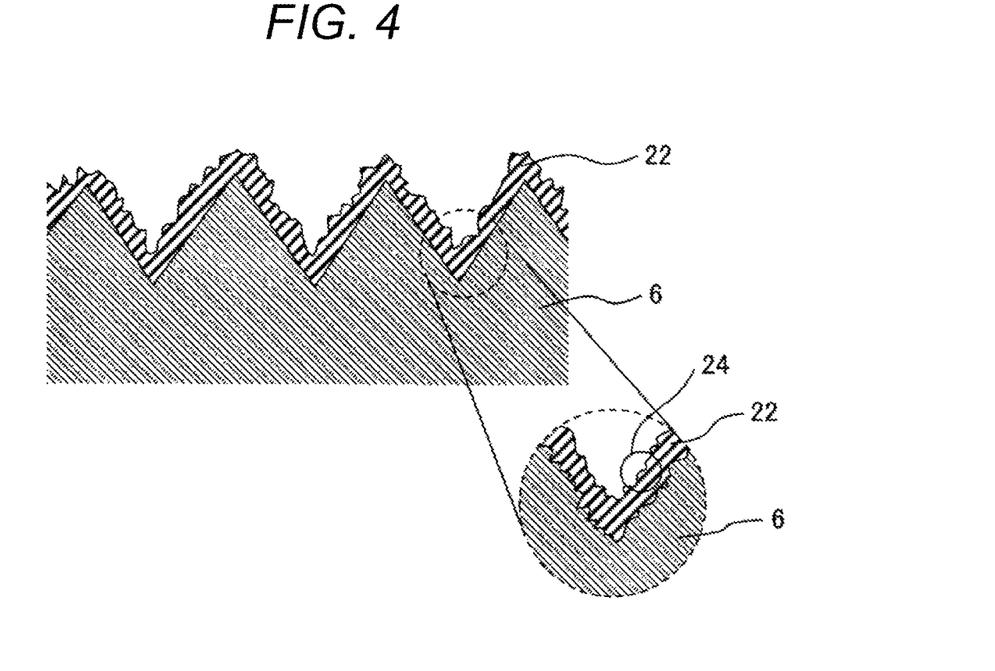
FIG. 4 is a cross-sectional view schematically illustrating an unevenness structure of the inner wall surface of the puffer cylinder 6 (after a chemical conversion treatment) according to the invention.

FIG. 4 is a cross-sectional view schematically illustrating an unevenness structure of the inner wall surface of the puffer cylinder 6 (after the chemical conversion treatment) according to the invention. By optimizing the treatment time of the chemical conversion treatment, as illustrated in FIG. 4, an aluminum hydrated oxide film 22 with a needle-shaped or petaloid-shaped unevenness structure (a micro unevenness structure) 24 finer than the unevenness structure of the puffer cylinder 6 was formed on the unevenness structure (the macro unevenness structure) of the puffer cylinder 6. As illustrated in the partially enlarged view of FIG. 4, the aluminum hydrated oxide film 22 is formed while eroding the surface of the puffer cylinder 6. The aluminum hydrated oxide film 22 has an unevenness structure which is further finer than the unevenness structure formed on the puffer cylinder 6 by machining. The unevenness structure of the aluminum hydrated oxide film 22 has an effect of scraping the wear rings 11 and 12 which are mating materials.

The average film thickness of the aluminum hydrated oxide film 22 of FIG. 4 was 1 μm or less and the average size of the unevenness (the protrusion length of the convex portion 20) was 0.1 μm. In this example, pure water was used for the chemical conversion treatment, but carbonate, oxalate, triethanolamine, hydrazine, seawater solute, a mixture of magnesium ion and bicarbonate ion, a mixture of magnesium ion, bicarbonate ion, and sulfate ion, a mixture of hydroxide ion and lithium ion, a mixture of hydroxide ion and calcium ion, a mixture of hydroxide ion, lithium ion, and nitrate ion, a mixture (sodium hydroxide) of hydroxide ion and sodium ion, a mixture (potassium hydroxide) of hydroxide ion and potassium ion, a hydroxide mixture, a sulfate salt, or the like may be used.

The average film thickness of the aluminum hydrated oxide film 22 may be larger than 1 μm, but is only about 3 μm in the chemical conversion treatment. In addition, the size of the unevenness structure of the puffer cylinder 6, the size of the unevenness structure of the aluminum hydrated oxide film 22, and the film thickness of the aluminum hydrated oxide film 22 can be observed by cross-sectional SEM (Scanning Electron Microscope).

The pH of the treatment liquid is desirably about 7 to 9. When the pH is larger than 10, the puffer cylinder 6 is undesirably eroded too much. Further, when the pH is smaller than 7, the aluminum hydrated oxide film 22 is not sufficiently formed.

Peaks of boehmite ($Al_2O_3 \cdot H_2O$), bayerite and gibbsite ($Al_2O_3 \cdot 3H_2O$) and the like were detected when the surface of the puffer cylinder 6 subjected to the chemical conversion treatment was analyzed by a powder X-ray diffraction measurement apparatus.

The place where the machining and the chemical conversion treatment are performed may be at least the sliding portions of the puffer cylinder 6 with respect to the wear rings 11 and 12, but the outer circumferential surface of the puffer cylinder may be also treated at the same time. Further, the cylinder shaft 7 of pure aluminum or aluminum alloy may be treated.

Figure 5:
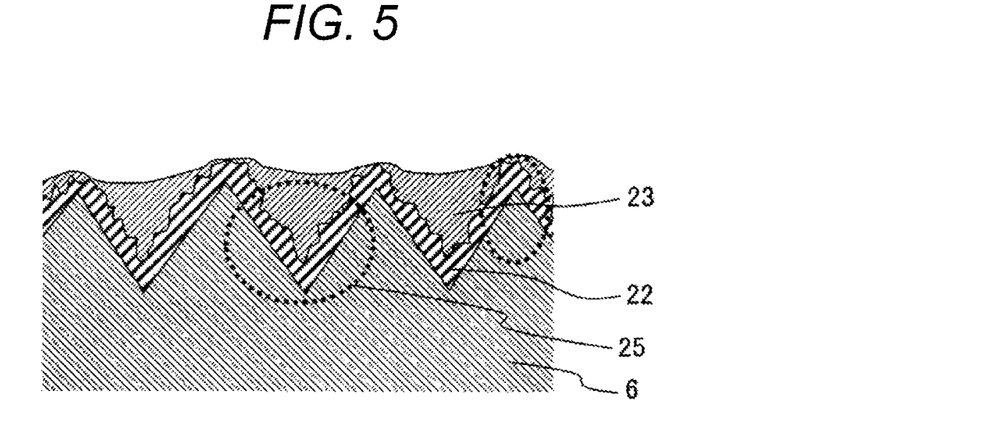
FIG. 5 is a cross-sectional view schematically illustrating an unevenness structure of the inner wall surface of the puffer cylinder 6 (after transferring a mating material) according to the invention.

FIG. 5 is a cross-sectional view schematically illustrating an unevenness structure of the inner wall surface of the puffer cylinder 6 (after transferring the mating material) according to the invention. According to the above-described example, since the unevenness structure is provided on the inner wall surface of the puffer cylinder 6 sliding on the wear rings 11 and 12 which are mating materials, the actual contact area of the wear rings 11 and 12 (in this example, PTFE (polytetrafluoroethylene) resin) which are mating materials decreases. Further, since the mating material is easily scraped (easily abraded) by the convex portion 20 of the puffer cylinder 6 and the unevenness structure 24 of the aluminum hydrated oxide film 22, abrasion powder 23 formed of a wear ring material can be held in a concave portion 21 of the puffer cylinder 6 (a part of Reference Numeral 25). Accordingly, since the abrasion of the puffer cylinder formed of aluminum alloy is suppressed due to the friction of the wear ring material, the generation of abrasion powder is suppressed. As a result, the abrasion resistance and the sliding characteristics can be improved.

The film (aluminum oxide ($Al_2O_3$)) formed by the alumite treatment (anodizing method) disclosed in PTL 1 has a shape in which fine cylindrical holes are regularly arranged, but the aluminum hydrated oxide film according to the invention has an irregularly arranged fine unevenness structure as described above. Regarding this point, both films are completely different from each other in shape.

Example 2

Figure 6:
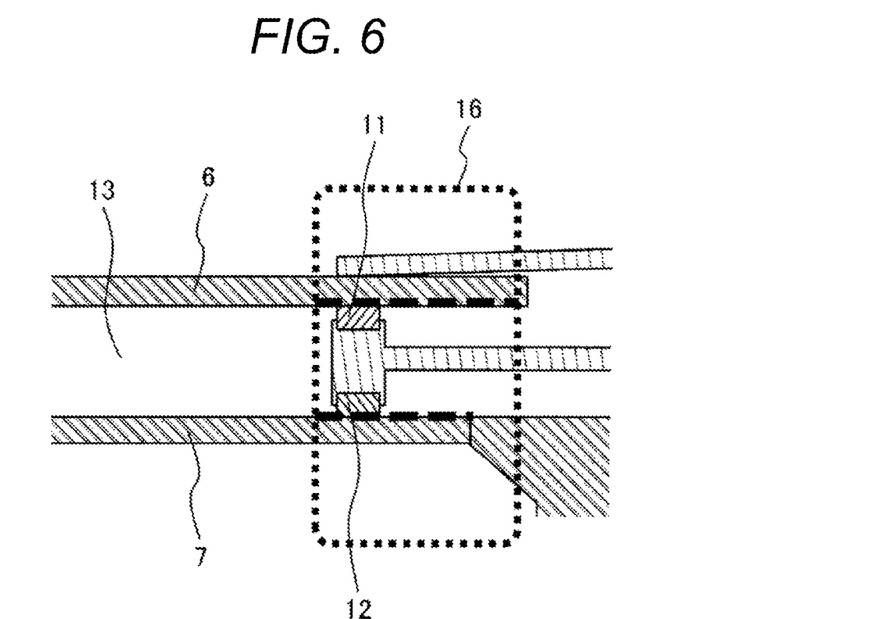
FIG. 6 is a cross-sectional view schematically illustrating a part of a puffer type gas circuit breaker according to Example 2.

FIG. 6 is a cross-sectional view schematically illustrating a part of a puffer type gas circuit breaker according to Example 2. In this example illustrated in the drawing, an unevenness structure having a substantially triangular cross-section similarly to Example 1 and having a surface roughness Ra (Ra=1.3) larger than those of the other parts was formed by machining in a part 16 of the sliding portions of the puffer cylinder 6 and the cylinder shaft 7 with respect to the wear rings 11 and 12 and an aluminum hydrated oxide film was formed on the surface thereof.

In this way, according to this example, since the unevenness structure is formed by machining on the inner wall surface of the puffer cylinder 6 and the outer wall surface of the cylinder shaft 7 in the periphery of the wear rings 11 and 12 in the power interruption state so that the surface roughness Ra increases and the actual contact area decreases, it is possible to reduce the abrasion amount of the wear rings 11 and 12 compared to a case where the unevenness structure is formed on the entire inner wall surface of the puffer cylinder 6. Further, since the formation of the transfer film of the wear rings 11 and 12 can be promoted at the position in the stopped state (the wearing rings 11 and 12 and the piston 10 in the stopped state), the puffer cylinder 6 and the cylinder shaft 7 are easily fitted to the wear rings 11 and 12 (while ensuring the sliding characteristics in the initial stage of sliding) and a direct contact between the base material formed of aluminum alloy and the wear ring material is prevented. As a result, a stable operation can be ensured.

Example 3

Figure 7:
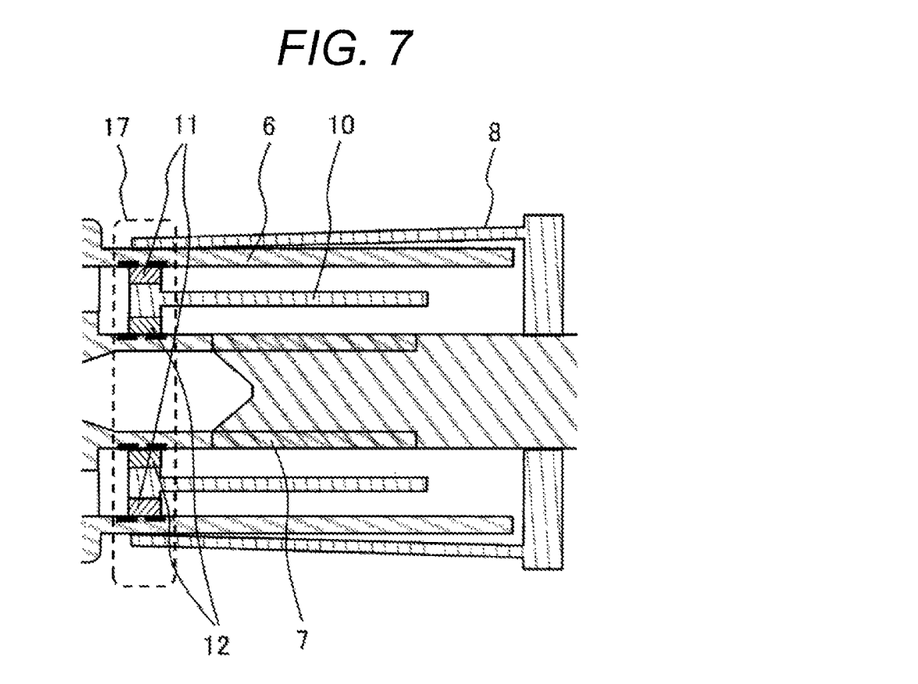
FIG. 7 is a cross-sectional view schematically illustrating a part of a puffer type gas circuit breaker according to Example 3.

FIG. 7 is a cross-sectional view schematically illustrating a part of a puffer type gas circuit breaker according to Example 3. In this example illustrated in the drawing, an unevenness structure having a substantially triangular cross-section similarly to Example 1 and having a surface roughness Ra (Ra=1.5) larger than those of the other parts was formed by machining in a part 17 of the sliding portion of the puffer cylinder 6 with respect to the wear rings 11 and 12 and an aluminum hydrated oxide film was formed on the surface thereof.

In this way, according to this example, since the unevenness structure is formed by machining on the inner wall surface of the puffer cylinder 6 and the outer wall surface of the cylinder shaft 7 in the periphery of the positions of the wear rings 11 and 12 in the power interruption state so that the surface roughness Ra becomes larger than that of Example 2 and the actual contact area decreases, it is possible to reduce the abrasion amount of the wear rings 11 and 12 compared to a case where the unevenness structure is formed on the entire inner wall surface of the puffer cylinder 6. Further, since the formation of the transfer film of the wear rings 11 and 12 at the position in the stopped state (the wear rings 11 and 12 and the piston 10 in the stopped state) can be promoted, the puffer cylinder 6 and the cylinder shaft 7 are easily fitted to the wear rings 11 and 12 (while ensuring the sliding characteristics in the initial stage of sliding) and a direct contact between the base material formed of aluminum alloy and the wear ring material is prevented. As a result, a stable operation can be ensured.

Example 4

Figure 8:
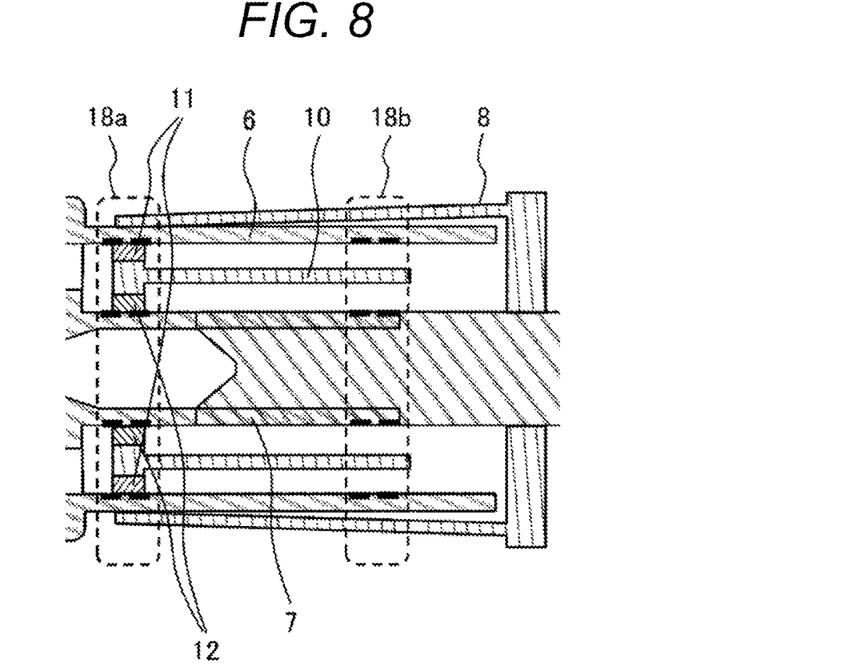
FIG. 8 is a cross-sectional view schematically illustrating a part of a puffer type gas circuit breaker according to Example 4.

FIG. 8 is a cross-sectional view schematically illustrating a part of a puffer type gas circuit breaker according to Example 4. In this example illustrated in the drawing, an unevenness structure having a substantially triangular cross-section similarly to Example 1 and having a surface roughness Ra (Ra=1.0) larger than those of the other parts was formed by machining in parts 18a and 18b of the sliding portions of the puffer cylinder 6 with respect to the wear rings 11 and 12 and an aluminum hydrated oxide film was formed on the surface thereof. When the Ra is in the range of 0.5 to 2 μm, the values at two positions (18a, 18b) may not be equal to each other.

In this way, according to this example, since the unevenness structure is formed by machining on the inner wall surface of the puffer cylinder 6 and the outer wall surface of the cylinder shaft 7 in the vicinity of the positions of the wear rings 11 and 12 in both the power supply state and the power interruption state so that the surface roughness Ra increases, it is possible to reduce the abrasion amount of the wear rings 11 and 12 compared to a case where the entire puffer cylinder is subjected to rough machining. Further, since the formation of the transfer film of the wear ring at the position in the stopped state can be promoted, the cylinder and the shaft are easily fitted to the wear ring and a direct contact between the base material formed of aluminum alloy and the wear rings 11 and 12 is prevented. Thus, a stable operation can be ensured.

Example 5

In this example, an unevenness structure was formed on the puffer cylinder 6 in the same manner as Example 1 and an aluminum hydrated oxide film was formed on the surface thereof. PEEK (polyetheretherketone) resin was used as the material of the wear rings 11 and 12. No significant abrasion was observed in the puffer cylinder 6 even when a sliding test was performed with this combination.

Example 6

In this example, an unevenness structure was formed on the puffer cylinder 6 in the same manner as Example 1 and an aluminum hydrated oxide film was formed on the surface thereof. Polyacetal resin was used as the material of the wear rings 11 and 12. No significant abrasion was observed in the puffer cylinder 6 even when a sliding test was performed with this combination.

Example 7

In this example, an unevenness structure was formed on the puffer cylinder 6 in the same manner as Example 1 and an aluminum hydrated oxide film was formed on the surface thereof. PA (polyamide) resin was used as the material of the wear rings 11 and 12. No significant abrasion was observed in the puffer cylinder 6 even when a sliding test was performed with this combination.

In addition, the wear rings 11 and 12 were formed of the same resin material, but may be formed of different resin materials. As the material of the wear rings 11 and 12, all resin materials can be generally adopted. However, among the resin materials, at least one selected from a group including polytetrafluoroethylene, polyetheretherketone, polyacetal, and polyamide is desirable.

In this way, when an unevenness is formed on the surface of the aluminum alloy and an aluminum hydrated oxide film is formed on the surface thereof, the abrasion resistance of the puffer cylinder 6 is improved compared to an untreated state and the same abrasion resistance as alumite and the like is illustrated under the operation conditions of the puffer type gas circuit breaker of the invention. Thus, it possible to form a film and treat waste liquid with simple equipment compared to alumite and the like.

Example 8

In this example, an unevenness structure of the puffer cylinder 6 was formed by shot peening of projecting fine steel balls at a high speed onto the mating material (the inner wall surface of the puffer cylinder 6) instead of machining. In this example, the shot peening was performed on the entire area of the sliding portions of the inner wall surface of the puffer cylinder 6 and the cylinder shaft 7 with respect to the wear rings 11 and 12, but may be performed only on a part of the sliding portions as in Examples 2 to 4.

Figure 9:
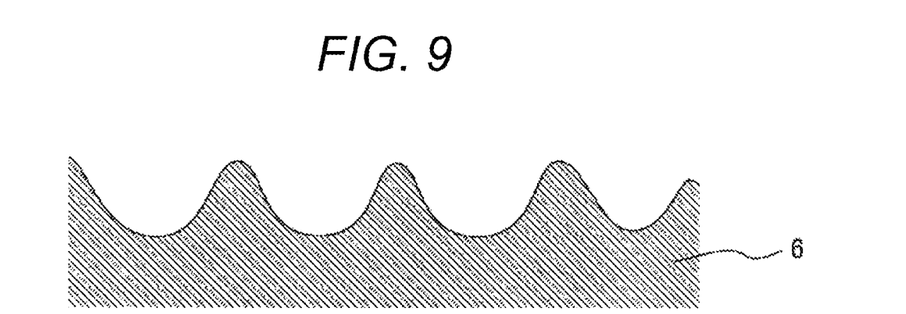
FIG. 9 is a cross-sectional view schematically illustrating an unevenness structure of the inner wall surface of the puffer cylinder 6 (after shot peening) according to Example 8.

FIG. 9 is a cross-sectional view schematically illustrating an unevenness structure of the inner wall surface of the puffer cylinder 6 (after shot peening) according to Example 8. As illustrated in FIG. 9, a processed cross-sectional shape has a structure having a crater-like concave portion. In this example, the surface roughness Ra of the inner wall surface was 1.2 μm.

Figure 10:
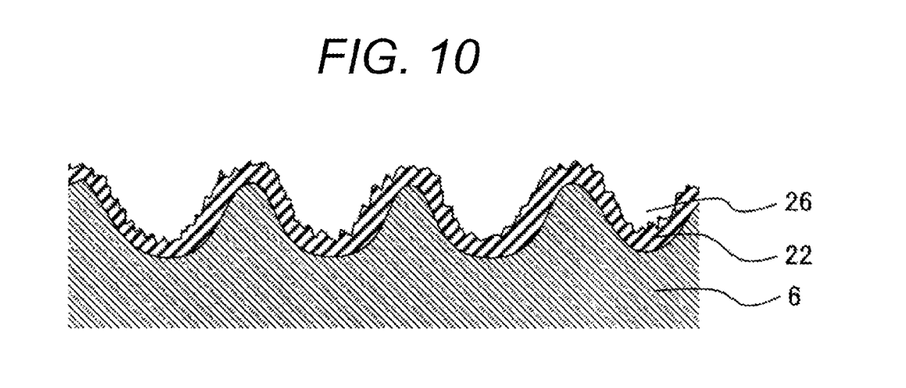
FIG. 10 is a cross-sectional view schematically illustrating an unevenness structure of the inner wall surface of the puffer cylinder 6 (after a chemical conversion treatment) according to Example 8.

FIG. 10 is a cross-sectional view schematically illustrating an unevenness structure of the inner wall surface of the puffer cylinder 6 (after a chemical conversion treatment) according to Example 8. The aluminum hydrated oxide film 22 was formed on the surface subjected to the shot peening. Since the mating material can be easily abraded by the convex portion, as illustrated in FIG. 10, abrasion powder of the wear ring material is held on the unevenness structure of the hydrated oxide film 22 and abrasion powder of the wear ring material can be also held by the crater-like concave portion 26. Therefore, since the abrasion of the puffer cylinder formed of aluminum alloy can be suppressed similarly to Example 1, the abrasion resistance is improved.

Further, when the shot peening is performed as in this example, a residual stress occurs in a shot peening target (the puffer cylinder 6, the cylinder shaft 7, and the like) due to a processing impact and thus the strength of the material can be improved.

Example 9

Figure 11:
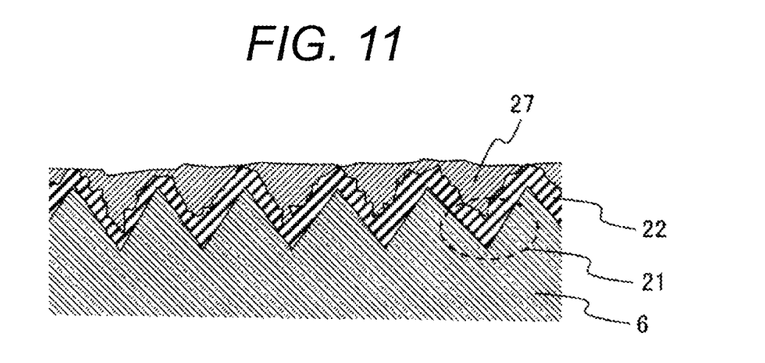
FIG. 11 is a cross-sectional view schematically illustrating an unevenness structure of the inner wall surface of the puffer cylinder 6 according to Example 9.

FIG. 11 is a cross-sectional view schematically illustrating an unevenness structure of the inner wall surface of the puffer cylinder 6 according to Example 9. In this example, an unevenness having a substantially triangular cross-section was formed on the puffer cylinder 6 as in Example 1 and the aluminum hydrated oxide film 22 was formed on the surface thereof. The film 27 formed of the same material as those of the wear rings 11 and 12 was formed on the surface. The film 27 is obtained by processing the same material as those of the wear rings 11 and 12 into fine powder so that an average particle diameter becomes 100 μm or less and forming a powder layer on the surface of the hydrated oxide film 22. At this time, the powder is easily held by the concave portion 21.

In this way, since the same material as that of the wear ring is formed on the surface of the puffer cylinder before the operation of the puffer cylinder, stable sliding characteristics can be obtained from the initial stage. Even when the film 27 is not formed of the same material as those of the wear rings 11 and 12 which are mating materials, the film can suppress abrasion as long as the film is formed of a material having the same hardness. That is, in a resin material (polytetrafluoroethylene, polyetheretherketone, polyacetal, polyamide, or the like) generally applied as a wear ring material, a Rockwell hardness (ASTM (American Society for Testing and Materials) D785 (ISO 2039-2: 1987) is 70 to 110 at the M scale or 10 to 130 at the R scale. Accordingly, it is desirable to form the film 27 by a material having such hardness. The polytetrafluoroethylene is 18 at the R scale, the polyetheretherketone is 104 at the M scale, the polyacetal is 80 at the M scale, and the polyamide is 120 at the R scale.

As in this example, a film formed of the same material as the mating material may be provided on the aluminum hydrated oxide film 22, but as in the above-described example, a method of scraping off the mating material to form the film 27 is more desirable from the viewpoint of a process cost in that the film formation process can be omitted.

Example 10

Figure 12:
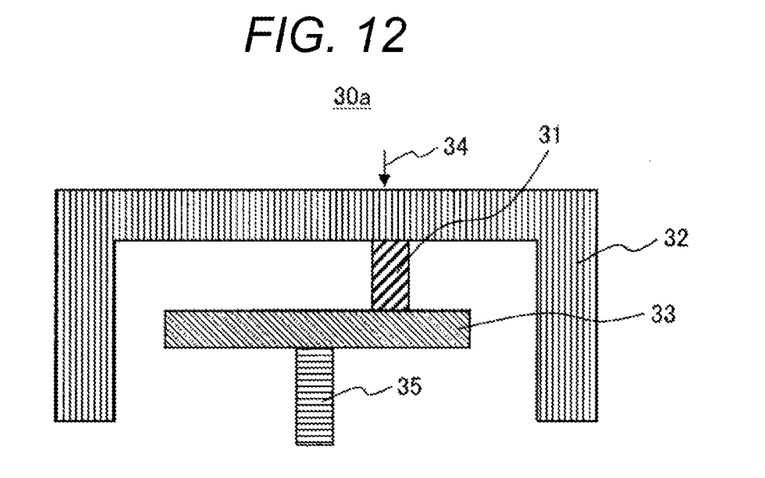
FIG. 12 is a cross-sectional view schematically illustrating an example of a pin-on-disk type testing machine.

FIG. 12 is a cross-sectional view schematically illustrating an example of a pin-on-disk type testing machine. In this example, the application of the invention to the abrasion resistant material other than the puffer cylinder will be described with reference to FIG. 12. The wear test described below was performed in accordance with JIS K 7218: 1986 B (corresponding to ASTM D2716).

As illustrated in the drawing, an unevenness structure was processed on a base material formed of aluminum alloy by shot peening so that a surface roughness Ra became 0.8 μm, and an aluminum hydrated oxide film was formed on the surface thereof, thereby obtaining a disk test piece 33. Then, a wear ring material was set in a test apparatus 30a as a pin-shaped test piece 31 having a diameter of 8 mm. The test conditions were such that the rotation speed of the disk was 1 m/s and a pressing load 34 was applied to the sliding portion through a cover 32.

As a result, even when a surface pressure was 9 MPa, abnormal abrasion was not observed at both the disk test piece 33 and the pin test piece 31. That is, it can be mentioned that the aluminum alloy having the hydrated oxide film according to the invention is also effective as a sliding product (an abrasion resistant material) other than the puffer cylinder.

Example 11

Figure 13:
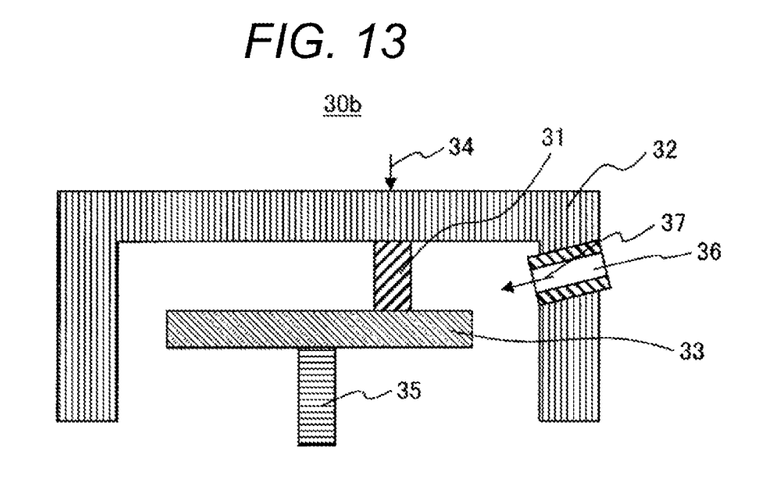
FIG. 13 is a cross-sectional view schematically illustrating another example of the pin-on-disk type testing machine.

FIG. 13 is a cross-sectional view schematically illustrating another example of a pin-on-disk type testing machine. In the pin-on-disk type testing machine 30b of this example, as illustrated in FIG. 13, a communication hole 36 was provided in the vicinity of the sliding portion of the apparatus of Example 10 and a nitrogen gas 37 was supplied therefrom at 10 L/min. The other conditions are the same as those of the former test.

As a result, abnormal abrasion was not found in the disk test piece 33 and the pin test piece 31 even under an inert gas having a surface pressure of 9 MPa.

Example 12

In this example, similarly to Example 10, an unevenness structure was provided on the disk test piece formed of aluminum alloy and an aluminum hydrated oxide film was formed on the surface thereof. In order to obtain the same effect as that of a case where a transfer film was formed on the surface thereof in advance, the wear ring material was processed into fine powders and was adhered to the surface of the aluminum hydrated oxide film. In this example, fine powder of the wear ring material was used, but a layer of the wear ring material may be formed by directly pressing the wear ring material against the hydrated oxide film. In this way, since a layer of the wear ring is formed on the disk test piece before the sliding, it is possible to reduce the friction and the abrasion of the wear ring material in the initial stage of the sliding.

Comparative Example 1

A base material of aluminum alloy was machined so that Ra became 0.8 μm and the same test as that of Example 10 was performed without forming an aluminum hydrated oxide film on the surface thereof. As a result, noticeable abrasion occurred in the aluminum alloy at a low surface pressure of 0.5 MPa.

Comparative Example 2

Similarly to Comparative Example 1, a base material formed of aluminum alloy was machined so that Ra became 0.8 μm and a nitrogen gas was supplied to the sliding portion similarly to Example 11 without forming an aluminum hydrated oxide film on the surface thereof. Even in this comparative example, noticeable abrasion occurred in the aluminum alloy at a low surface pressure of 0.5 MPa.

From the above results, it is understood that the abrasion resistant material according to the invention is excellent in abrasion resistance not only in air but also in a nitrogen gas.

As described above, according to the invention, it has been proved that the abrasion resistant material having excellent abrasion resistance, the puffer cylinder, and the puffer type gas circuit breaker can be provided.

It should be noted that the invention is not limited to the examples described above, but includes various modified examples. For example, the above-described examples have been described in detail in order to easily describe the invention, and are not necessarily limited to those having all configurations described above. In addition, a part of the configuration of one example can be replaced by the configuration of another example, and the configuration of another example can be added to the configuration of one example. Further, apart of the configurations of the examples can be added, deleted, and replaced by the other configurations.

REFERENCE SIGNS LIST

1 fixed arc contact
2 fixed main contact
3 insulation nozzle
4 movable main contact
5 movable contact
6 puffer cylinder (base material)
7 cylinder shaft
8 external collector
10 piston
11, 12 wear ring
13 puffer room
14 insulated operation rod
15 part subjected to machining and hydrated oxide film treatment
16, 17 part of puffer cylinder
18 link
20 convex portion
21 concave portion
22 hydrated oxide film
23 mating material transferred to puffer cylinder
24 unevenness structure of hydrated oxide film
25 concave portion having wear ring material transferred thereto
26 concave portion
27 film
30a, 30b pin-on-disk type testing machine
31 pin-shaped test piece
32 cover
33 disk test piece
34 pressing load
35 rotary shaft
36 communication hole
37 nitrogen gas
100a, 100b puffer type gas circuit breaker

The invention claimed is:

1. An abrasion resistant material comprising:
  a base material which is formed of pure aluminum or aluminum alloy and has an unevenness structure formed on its surface; and
  an aluminum hydrated oxide film which is formed on the surface of the base material,
  wherein a surface of the aluminum hydrated oxide film is provided with an unevenness structure which is finer than the unevenness structure of the base material.

2. The abrasion resistant material according to claim 1, wherein a film formed of a material having a Rockwell hardness of 70 to 110 at the M scale or 10 to 130 at the R scale is formed on the surface of the aluminum hydrated oxide film.

3. The abrasion resistant material according to claim 2, wherein the film is at least one selected from a group including polytetrafluoroethylene, polyetheretherketone, polyacetal, and polyamide.

4. The abrasion resistant material according to claim 3, wherein the aluminum hydrated oxide film is formed by a chemical conversion treatment on the base material.

5. The abrasion resistant material according to claim 4, wherein an arithmetic average roughness Ra of the surface of the base material is larger than an arithmetic average roughness Ra of the surface of the aluminum hydrated oxide film.

6. The abrasion resistant material according to claim 5, wherein the arithmetic average roughness Ra of the surface of the base material is 0.5 to 2 μm.

7. The abrasion resistant material according to claim 1, wherein the aluminum hydrated oxide film is formed by a chemical conversion treatment on the base material.

8. The abrasion resistant material according to claim 1, wherein an arithmetic average roughness Ra of the surface of the base material is larger than an arithmetic average roughness Ra of the surface of the aluminum hydrated oxide film.

9. The abrasion resistant material according to claim 1, wherein the arithmetic average roughness Ra of the surface of the base material is 0.5 to 2 μm.

10. A puffer cylinder which is formed as a hollow cylindrical member by pure aluminum or aluminum alloy,
  wherein a piston is fitted into the member and the piston moves in a reciprocating manner while sliding on an inner wall surface of the member,
  wherein a surface of the inner wall surface is provided with an unevenness structure in at least a part sliding on the piston,
  wherein a surface of the unevenness structure is provided with an aluminum hydrated oxide film, and
  wherein a surface of the aluminum hydrated oxide film is provided with an unevenness structure which is finer than the unevenness structure of the inner wall surface.

11. The puffer cylinder according to claim 10, wherein a wear ring is provided between the inner wall surface and the piston, and
  wherein the inner wall surface and the piston slide on each other through the wear ring.

12. The puffer cylinder according to claim 11,
wherein an entire surface of the inner wall surface is provided with an unevenness structure,
wherein a surface of the unevenness structure is provided with an aluminum hydrated oxide film, and
wherein the surface of the aluminum hydrated oxide film is provided with an unevenness structure which is finer than the unevenness structure of the inner wall surface.

13. The puffer cylinder according to claim 12,
wherein the surface of the aluminum hydrated oxide film is provided with a film which is formed of a same material as that of the piston or the wear ring.

14. The puffer cylinder according to claim 13,
wherein the aluminum hydrated oxide film is formed by a chemical conversion treatment on the member.

15. The puffer cylinder according to claim 14,
wherein an arithmetic average roughness Ra of the surface of the member is larger than an arithmetic average roughness Ra of the surface of the aluminum hydrated oxide film.

16. The puffer cylinder according to claim 15,
wherein the arithmetic average roughness Ra of the surface of the base material is 0.5 to 2 μm.

17. A puffer type gas circuit breaker comprising:
a container which is filled with an arc extinguishing gas;
a fixed contact; a movable contact; a puffer cylinder; and a piston which are provided inside the container,
wherein the movable contact is connected to the fixed contact to be movable close thereto and away therefrom,
wherein the puffer cylinder is connected to the movable contact,
wherein the piston is provided inside the puffer cylinder and is adapted to move while sliding on an inner wall surface of the puffer cylinder and to suck and eject an arc extinguishing gas so that an arc generated in an opening between the fixed contact and the movable contact disappears by the gas blowing to the arc, and
wherein the puffer cylinder is the puffer cylinder according to claim 16.

18. The puffer cylinder according to claim 10,
wherein an entire surface of the inner wall surface is provided with an unevenness structure,
wherein a surface of the unevenness structure is provided with an aluminum hydrated oxide film, and
wherein the surface of the aluminum hydrated oxide film is provided with an unevenness structure which is finer than the unevenness structure of the inner wall surface.

19. The puffer cylinder according to claim 10,
wherein the surface of the aluminum hydrated oxide film is provided with a film which is formed of a same material as that of the piston or the wear ring.

20. The puffer cylinder according to claim 10,
wherein the aluminum hydrated oxide film is formed by a chemical conversion treatment on the member.

* * * * *